(12) United States Patent
Kawanabe et al.

(10) Patent No.: US 9,208,119 B2
(45) Date of Patent: Dec. 8, 2015

(54) DATA TRANSMITTING DEVICE FOR ADJUSTING SIGNAL TRANSMISSION, IMAGE FORMING APPARATUS, DATA TRANSMISSION CONTROLLING METHOD, AND RECORDING MEDIUM STORING DATA TRANSMISSION CONTROL PROGRAM THEREOF

(71) Applicants: Motohiro Kawanabe, Osaka (JP);
Tatsuya Miyadera, Kanagawa (JP);
Masayuki Hayashi, Osaka (JP);
Yoshinori Shirasaki, Osaka (JP);
Masatoshi Murakami, Osaka (JP)

(72) Inventors: Motohiro Kawanabe, Osaka (JP);
Tatsuya Miyadera, Kanagawa (JP);
Masayuki Hayashi, Osaka (JP);
Yoshinori Shirasaki, Osaka (JP);
Masatoshi Murakami, Osaka (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/074,007

(22) Filed: Nov. 7, 2013

(65) Prior Publication Data
US 2014/0153042 A1    Jun. 5, 2014

(30) Foreign Application Priority Data

Dec. 3, 2012  (JP) .................... 2012-263935

(51) Int. Cl.
*G06F 3/12*  (2006.01)
*G06F 13/40*  (2006.01)
*G06F 13/42*  (2006.01)
*H04N 1/00*  (2006.01)

(52) U.S. Cl.
CPC ........ *G06F 13/4068* (2013.01); *G06F 13/4204* (2013.01)

(58) Field of Classification Search
CPC .................... G06F 13/4204; G06F 13/4068
USPC .......... 358/1.1, 1.14, 1.15, 405, 425, 426.08; 370/211, 229, 280, 281, 282, 294, 314
See application file for complete search history.

(56) References Cited

U.S. PATENT DOCUMENTS

| | | | | |
|---|---|---|---|---|
| 5,585,945 A * | 12/1996 | Ikeda et al. | .................... | 358/540 |
| 5,726,779 A * | 3/1998 | Kadowaki et al. | ............ | 358/520 |
| 7,899,290 B2 * | 3/2011 | Mayer et al. | .................. | 385/100 |
| 8,520,260 B2 * | 8/2013 | Tamura | ........................ | 358/3.06 |
| 2008/0130021 A1 * | 6/2008 | Inoue et al. | .................... | 358/1.7 |

FOREIGN PATENT DOCUMENTS

| | | |
|---|---|---|
| JP | 2002-283609 | 10/2002 |
| JP | 2007-118495 | 5/2007 |
| JP | 2010-217381 | 9/2010 |

* cited by examiner

*Primary Examiner* — Gabriel Garcia
(74) *Attorney, Agent, or Firm* — Harness, Dickey & Pierce, P.L.C.

(57) ABSTRACT

A data transmitting device is provided. The data transmitting device includes plural bundles of signal lines, each of which includes flatly arranged plural signal lines and which are overlaid in such a manner that surfaces of the bundles of signal lines are contacted with each other while the signal lines extend in a same direction, wherein signal transmission and reception are performed through the signal lines; a transmission timing adjuster to adjust signal transmission timing for each of the plural bundles of signal lines; and a transmission timing controller to perform time division control such that the transmission timing adjuster adjusts the signal transmission timing under the time division control for each of the plural bundles of signal lines.

9 Claims, 12 Drawing Sheets

FIG. 7

| | | | | | | | | | | | |
|---|---|---|---|---|---|---|---|---|---|---|---|
| GND | CLK P | CLK N | GND | CONTROL SIGNAL | DATA[7:0] | CONTROL SIGNAL | GND | POWER SOURCE | GND | POWER SOURCE | 62K |
| GND | CLK P | CLK N | GND | CONTROL SIGNAL | DATA[7:0] | CONTROL SIGNAL | GND | POWER SOURCE | GND | POWER SOURCE | 62C |
| GND | CLK P | CLK N | GND | CONTROL SIGNAL | DATA[7:0] | CONTROL SIGNAL | GND | POWER SOURCE | GND | POWER SOURCE | 62M |
| GND | CLK P | CLK N | GND | CONTROL SIGNAL | DATA[7:0] | CONTROL SIGNAL | GND | POWER SOURCE | GND | POWER SOURCE | 62Y |

DATA TRANSMITTING DEVICE FOR ADJUSTING SIGNAL TRANSMISSION, IMAGE FORMING APPARATUS, DATA TRANSMISSION CONTROLLING METHOD, AND RECORDING MEDIUM STORING DATA TRANSMISSION CONTROL PROGRAM THEREOF

CROSS-REFERENCE TO RELATED APPLICATIONS

This patent application is based on and claims priority pursuant to 35 U.S.C. §119 to Japanese Patent Application No. 2012-263935 filed on Dec. 3, 2012 in the Japan Patent Office, the entire disclosure of which is hereby incorporated by reference herein.

TECHNICAL FIELD

This disclosure relates to a data transmitting device, and to an image forming apparatus using the data transmitting device. In addition, this disclosure relates to a data transmission controlling method, and to a recording medium storing a data transmission control program.

BACKGROUND

Recently, image forming apparatus such as copiers, facsimiles and printers, image forming apparatus using an image reading device such as scanners, and electronic apparatus such as computers and home electric appliances are downsized, and boards therein are typically connected with each other using a flexible flat cable (FFC). Since FFCs are thin and have good flexibility, FFCs greatly contribute to downsizing of such apparatuses.

Particularly, in electrophotographic image forming apparatus, a light emitting diode (LED) array head, in which plural LED arrays each including a line of LEDs are arranged in the main scanning direction, is typically used as a light source of the image forming apparatus. In this regard, a control board of the image forming apparatus is typically connected with each LED array head using a FFC. Therefore, the number of the FFCs is equal to the number of the LED array heads. Since the LED array heads are arranged in parallel in the main scanning direction and the costs of the FFC increases as the number of folded portions of the FFC increases, it is preferable to arrange the FFCs in an efficient manner in order to downsize the apparatus while reducing costs thereof. In attempting to arrange the FFCs in an efficient manner, JP-2010-217381-A discloses a technique in that FFCs are arranged while overlaid until the FFCs reach positions at which the FFCs are connected to the corresponding LED array heads.

Recently, there is a need for high-speed and high-definition electric apparatus such as image forming apparatus. Specifically, there is a need for an image forming apparatus which can form high definition images at a high speed while having a high image reading speed and a high image processing speed. In such image forming apparatus, as the image forming speed increases, the data transmission speed also increases.

However, the above-mentioned technique has a drawback in that since FFCs are arranged while overlaid, a cross talk problem is caused when data transmission is performed, and thereby data are mistakenly transmitted.

Specifically, the thus arranged FFCs while overlaid causes the cross talk problem. The cross talk problem is such that whenever a signal is sent (driven) through a wire in a FFC, a magnet field is generated around the wire. In this regard, when another wire is arranged close by the wire, the magnetic fields generated by the two wires interact with each other, and cross join of energy occurs between the signals flowing through the two wires.

When such a cross talk problem is caused, the signals flowing the FFC are adversely affected thereby, and it becomes difficult to perform accurate data transmission.

Particularly, in an electrophotographic image forming apparatus, in which LED array heads are connected with a control board using FFCs, a memory storing correction data, which are used for correcting variations of LEDs, is typically provided in an irradiating head including the LED array heads. When the control board sends a lighting signal to a LED, the control board also transmits the correction data at the same time before printing. In this regard, if the correction data are not accurately transmitted, variations among the LEDs cannot be corrected, thereby causing a problem in that an abnormal image such as vertical strip-shaped images is formed in an image.

SUMMARY

This patent specification describes a novel data transmitting device. One example of the data transmitting device includes plural bundles of signal lines, each of which includes flatly arranged plural signal lines and which are overlaid in such a manner that surfaces of the bundles of signal lines are contacted with each other while the signal lines extend in the same direction, wherein signal transmission and reception are performed through the signal lines; a transmission timing adjuster to adjust transmission timing of signal for each of the plural bundles of signal lines; and a transmission timing controller to perform time division control such that the transmission timing adjuster adjusts the transmission timing under the time division control for each of the plural bundles of signal lines.

This patent specification further describes a novel image forming apparatus. One example of the image forming apparatus includes plural LED arrays to emit light beams from LEDs thereof; plural bundles of signal lines; and the above-mentioned data transmitting device to transmit image data for controlling lighting of each of the LEDs of the plural LED arrays and correction data for use in correcting the image data through the plural bundles of signal lines.

This patent specification further describes a novel data transmission controlling method for controlling data transmission and reception using plural bundles of signal lines, each of which includes flatly arranged plural bundles of signal lines and which are overlaid in such a manner that surfaces of the bundles of signal lines are contacted with each other while the signal lines extend in the same direction. One example of the data transmission controlling method includes adjusting transmission timing of signals, which are to be transmitted through the plural bundles of signal lines, for each of the plural bundles of signal lines; and performing time division control such that the signal transmission timing is adjusted under the time division control for each of the plural bundles of signal lines.

This patent specification further describes a novel non-transitory recording medium. One example of the non-transitory recording medium stores computer instructions, which, when executed by a processor, cause the processor to perform the data transmission controlling method mentioned above.

BRIEF DESCRIPTION OF THE SEVERAL VIEWS OF THE DRAWINGS

A more complete appreciation of aspects of the invention and many of the attendant advantage thereof will be readily obtained as the same become better understood by reference to the following detailed description when considered in connection with the accompanying drawings, wherein:

FIG. 7 is a view for describing signals flowing through overlaid FFCs;

DETAILED DESCRIPTION

Figure 1:
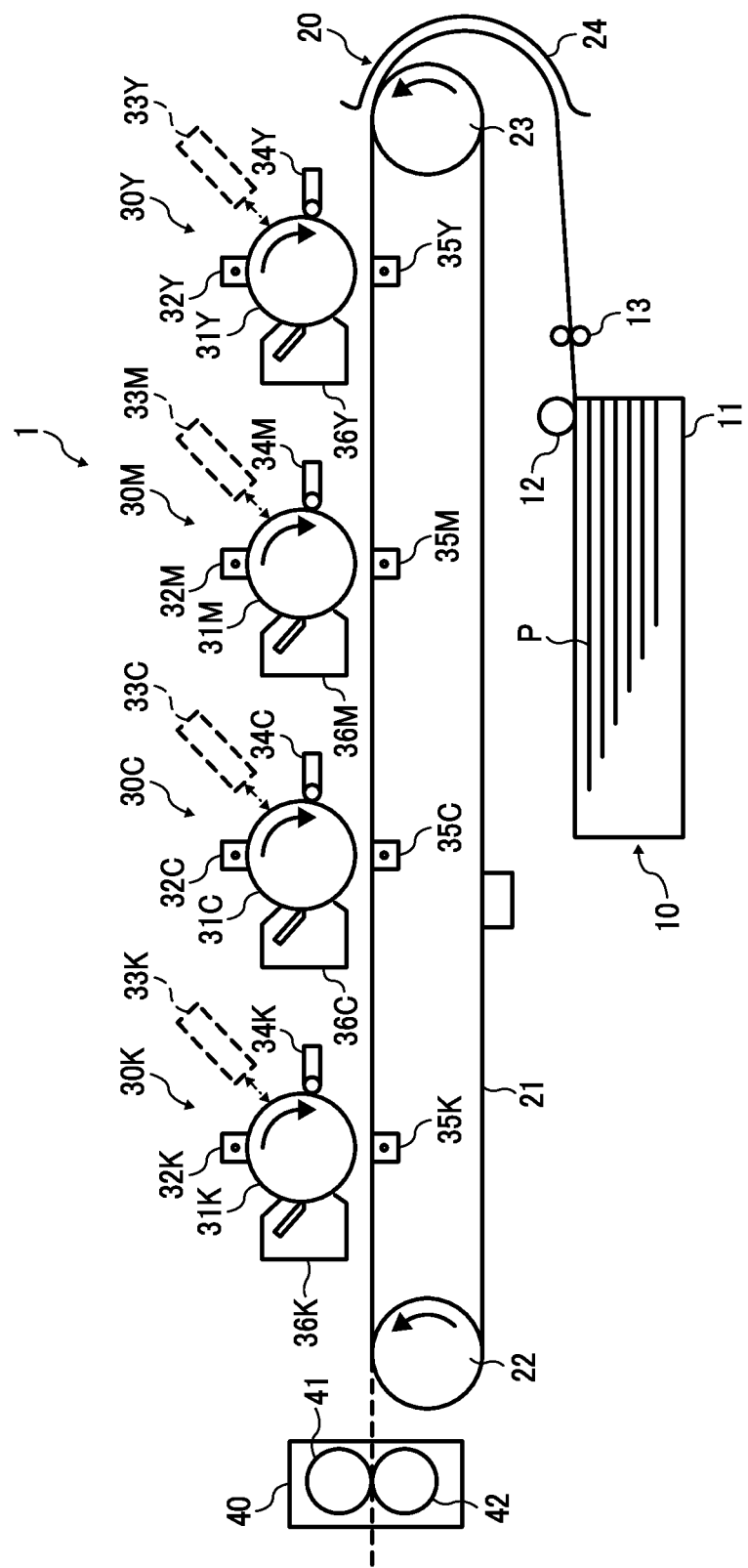
FIG. 1 is a schematic view illustrating an example of an image forming apparatus according to an embodiment.

It will be understood that if an element or layer is referred to as being "on", "against", "connected to" or "coupled to" another element or layer, then it can be directly on, against, connected or coupled to the other element or layer, or intervening elements or layers may be present. In contrast, if an element is referred to as being "directly on", "directly connected to" or "directly coupled to" another element or layer, then there are no intervening elements or layers present. Like numbers referred to like elements throughout. As used herein, the term "and/or" includes any and all combinations of one or more of the associated listed items.

Spatially relative terms, such as "beneath", "below", "lower", "above", "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

Although the terms first, second, etc. may be used herein to describe various elements, components, regions, layers and/or sections, it should be understood that these elements, components, regions, layer and/or sections should not be limited by these terms. These terms are used only to distinguish one element, component, region, layer or section from another region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Referring now to the drawings, wherein like reference numerals designate identical or corresponding parts throughout the several views, example embodiments of the present patent application are described.

The object of this disclosure is to perform accurate signal transmission using plural bundles of signal lines, each of which include flatly arranged plural signal lines and which are overlaid, without causing the cross talk problem.

Hereinafter, a preferred example of the data transmitting device, the image forming apparatus, the data transmission controlling method, and the data transmission control program will be described by reference to drawings. Since the example is a preferred example, technically preferred limitations are imposed thereto. However, the data transmitting device, the image forming apparatus, the data transmission controlling method, and the data transmission control program of this disclosure are not limited thereto, and the constituents described below are not necessarily essential constituents.

Example 1

FIGS. 1-13 are views illustrating an example of the data transmitting device, the image forming apparatus, the data transmission controlling method, and the data transmission control program of this disclosure, and FIG. 1 is a schematic view illustrating a main portion of an image forming apparatus to which an example of the data transmitting device, the image forming apparatus, the data transmission controlling method, and the data transmission control program of this disclosure is applied.

Referring to FIG. 1, an image forming apparatus 1 includes a recording medium feeding portion 10, a feeding belt mechanism 20, Y (yellow), M (magenta), C (cyan) and K (black) image forming sections 30Y, 30M, 30C and 30K, and a fixer 40, which are arranged in a chassis (not shown) of the image forming apparatus. The image forming apparatus 1 further includes other devices such as motors (not shown), drive mechanisms (not shown) to transmit driving forces to parts to be driven by the motors, and operating/displaying portion 54 illustrated in FIG. 2.

The recording medium feeding portion 10 includes a recording medium cassette 11, a feed roller 12, a separation roller 13, a registration roller (not shown), etc. The recoding medium feeding portion 10 feeds sheets P of a recording medium in the recording medium cassette 11 one by one while separating the recording medium sheets P using the feed roller 12 and the separation roller 13. The registration roller timely feeds the recording medium sheet P thus fed from the recording medium cassette 11 toward the feeding belt mechanism 20.

The feeding belt mechanism 20 includes a feeding belt 21, a driving roller 22, a driven roller 23, and a guide plate 24. The feeding belt 21 is an endless ring-shaped belt, and is tightly stretched by the driving roller 22 and the driven roller 23. The feeding belt 21 is rotated counterclockwise in FIG. 1 by the driving roller 22, which is rotated by a driving mechanism such as a motor under control of a controller (not shown). The feeding belt 21 rotated counterclockwise by the driving roller 22 feeds the recoding medium sheet P, which is fed from the recording medium feeding portion 10 and which is guided to the feeding belt 21 by the guide plate 24, to the image forming sections 30Y, 30M, 30C and 30K in this order. Yellow, magenta, cyan and black toner images formed by the image forming sections 30Y, 30M, 30C and 30K are sequentially transferred onto the recoding medium sheet P fed by the feeding belt 21, thereby forming a combined color toner image, in which the yellow, magenta, cyan and black toner images are overlaid.

The image forming sections 30Y, 30M, 30C and 30K respectively include photoreceptors 31Y, 31M, 31C and 31K, which are arranged at regular intervals in the feeding direction of the feeding belt 21. In addition, the image forming sections 30Y, 30M, 30C and 30K respectively include chargers 32Y, 32M, 32C and 32K, irradiators 33Y, 33M, 33C and 33K, developing devices 34Y, 34M, 34C and 34K, transferring devices 35Y, 35M, 35C and 35K, cleaners 36Y, 36M, 36C and 36K, dischargers (not shown), etc., which are arranged in the vicinity of the corresponding photoreceptors 31Y, 31M, 31C and 31K.

The chargers 32Y, 32M, 32C and 32K evenly charges the corresponding photoreceptors 31Y, 31M, 31C and 31K, which are rotated clockwise in FIG. 1 by a driving mechanism (not shown). The irradiators 33Y, 33M, 33C and 33K irradiate the charged photoreceptors 31Y, 31M, 31C and 31K with light beams, which are modulated with corresponding color image data, to form electrostatic latent images on the photoreceptors. The developing devices 34Y, 34M, 34C and 34K respectively develop the electrostatic latent images on the corresponding photoreceptors 31Y, 31M, 31C and 31K using Y, M, C and K toners to form Y, M, C and K toner images on the corresponding photoreceptors. When the recording medium sheet P is fed between the feeding belt 21 and the photoreceptors 31Y, 31M, 31C and 31K, the transferring devices 35Y, 35M, 35C and 35K, which are arranged on the backside of the feeding belt 21, apply a transfer potential to the feeding belt 21 to sequentially transfer the Y, M, C and K toner images to the recording medium sheet P. After transferring the color toner images, the cleaners 36Y, 36M, 36C and 36K clean the surfaces of the photoreceptors 31Y, 31M, 31C and 31K to remove residual toners on the photoreceptors, and the dischargers discharge the photoreceptors. The thus cleaned and discharged photoreceptors 31Y, 31M, 31C and 31K are subjected to the next image forming operation starting from the charging process using the chargers 32Y, 32M, 32C and 32K.

The recording medium sheet P bearing the combined color toner image thereon is further fed by the feeding belt 21 while electrostatically attracted by the feeding belt, and is then separated from the feeding belt 21 at a position above the driving roller 22 to be fed into the fixer 40.

The fixer 40 includes a fixing roller 41, a pressure roller 42, and a thermistor, a thermostat, and a fixing heater, which are not shown in FIG. 1. The fixing roller 41 and the pressure roller 42 are pressed to each other by a predetermined pressing force. One of the fixing roller 41 and the pressure roller 42 is rotated, and the other is driven to rotate. A fixing heater, which heats the fixing roller 41 to a fixing temperature corresponding to the energy applied to the fixing roller, is set in the fixing roller 41. By controlling the energy applied to the fixing heater, the fixing temperature is controlled so as to be the predetermined temperature.

In the fixing device 40, the fixing roller 41 and the pressure roller 42 feed the recording medium sheet P, which bears the combined color toner image thereon and which is fed by the feeding belt 21, while heating and pressing the recording medium sheet to fix the color toner image thereon. The recording medium sheet P bearing the fixed color toner image is then discharged so as to be stacked on a copy tray (not shown).

A thermistor is provided in the vicinity of the fixing roller 41 to detect the temperature of the surface of the fixing roller 41, and the thermistor outputs a signal of the detected temperature, which is an analog voltage. A thermostat is provided in the vicinity of the fixing roller 41 while connected with a power line to the fixing heater. When the temperature of the thermostat is increased so as to be not lower than the cutoff temperature, the thermostat is turned off, thereby shutting off supply of a power to the fixing heater.

The irradiators 33Y, 33M, 33C and 33K include LED array heads for forming optical images corresponding to Y, M, C and K color images on the photoreceptors 31Y, 31M, 31C and 31K. In the LED array heads, the LEDs are subjected to lighting control based on Y, M, C and K color image data to irradiate the photoreceptors 31Y, 31M, 31C and 31K with writing light beams, thereby forming electrostatic latent images on the photoreceptors.

Figure 2:
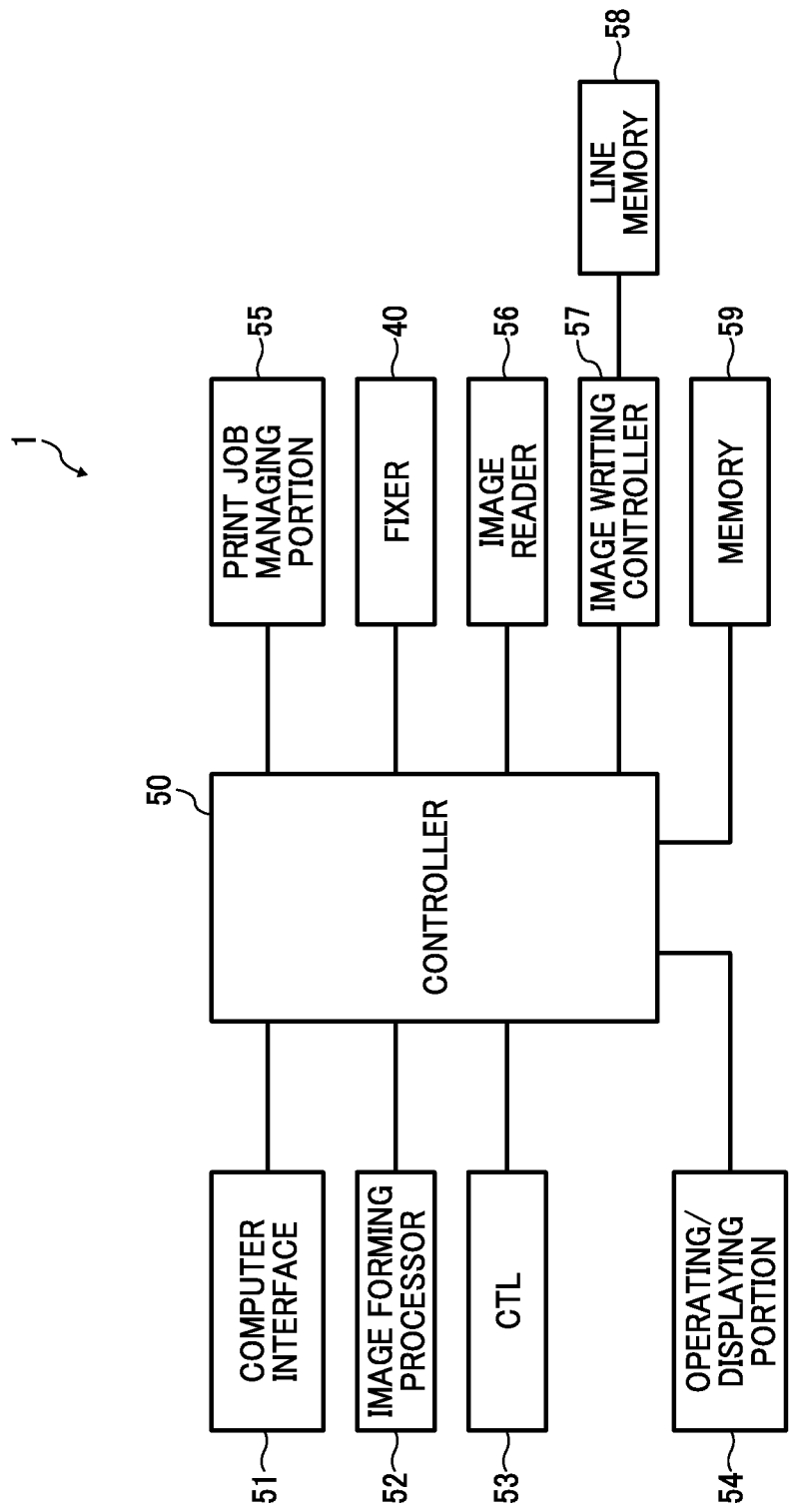
FIG. 2 is a block diagram illustrating the image forming apparatus.

The image forming apparatus 1 has such a block configuration as illustrated in FIG. 2, and includes a controller 50, a computer interface 51, an image forming processor 52, a CTL (control terminal) 53, the operating/displaying portion 54, a print job managing portion 55, the fixer 40, an image reader 56, an image writing controller 57, a line memory 58, a memory 59, etc.

The controller 50 controls the devices of the image forming apparatus 1 so that the image forming apparatus can perform the functions thereof and the image formation control processing of this disclosure can be performed. The controller 50 includes a CPU (central processing unit), a ROM (read only memory), a RAM (random access memory), etc. The ROM stores a basic program for controlling the image forming apparatus 1, the below-mentioned data transmission control program, and data used for executing these programs. In the controller 50, the CPU performs the basic processing of the image forming apparatus 1 by controlling the devices of the image forming apparatus according to the program stored in the ROM using the RAM as a work memory, and performs the below-mentioned data transmission control processing of this disclosure.

The computer interface 51 is an interface through which communication is performed via a network between the image forming apparatus 1 and an information processor such as computers which makes a print order to the image forming apparatus while transmitting print data thereto.

The image forming processor 52 includes the recording medium feeding portion 10, the feeding belt mechanism 20, and the image forming sections 30Y, 30M, 30C and 30K, which are arranged along the feeding belt mechanism, and prints images on the recording medium P using electrophotography under control of the controller 50.

The CTL 53 transmits the image data, which are transmitted from the information processor via a network or which are obtained by reading an image using the image reader 56, to the controller 50 to make an image formation order.

The operating/displaying portion 54 includes operation keys used for performing a print processing, and a display (such as liquid crystal displays). In the operating/displaying portion 54, various orders for operating the image forming apparatus (such as input of the number of prints) are made by the operation keys, and the contents of the order input by the operation keys and information for the user from the image forming apparatus 1 are displayed in the display. In addition, the operating/displaying portion 54 outputs operational data to the controller 50, and displays various kinds of information in the display under control of the controller 50.

The print job managing portion 55 receives print orders made to the image forming apparatus 1 and print data as print jobs, and performs print execution management such as management of the order of the print jobs.

The fixer 40 feeds the recording medium P bearing a toner image thereon, which is transferred thereto by the image forming processor 52, while heating and pressing the recording medium to fix the toner image on the recording medium.

The image reader 56 includes, for example, a line image sensor using a CCD (charge coupled device), and typically includes an ADF (automatic document feeder). Plural original document sheets can be set on the ADF, and the ADF feeds the original document sheets one by one to the image reading position of the image reader 56. The image reader 56 scans the original document sheet fed from the ADF to read the image of the original document at a predetermined resolution, and transmits the image data to the controller 50.

The image writing controller 57 converts the image data transmitted from the CTL 53 to irradiation signals used for flashing the LEDs provided on the LED array heads of the irradiator 33Y, 33M, 33C and 33K, and performs lighting control on each of the LEDs.

The image writing controller 57 serves as a data transmission controller for performing accurate data transmission without causing the cross talk problem. Specifically, as mentioned below, the image writing controller 57 controls transmission of signals such as image data and correction data to be transmitted to the LED array heads of the irradiator 33Y-33K to prevent FFCs 62Y, 62M, 62C and 62K (illustrated in FIGS. 4-6) from causing the cross talk problem.

The line memory 58 is a buffer to store the image data transmitted from the CTL 53 in each line of the image, and is used for adjusting the amount of skew in the image processing performed by the image writing controller 57.

The memory 59 includes a non-volatile memory or the like, and stores parameters used for operating the image forming apparatus 1.

In the image forming apparatus 1, by reading a data transmission control program, which executes the data transmission controlling method of this disclosure and which is stored in a readable recording medium such as ROMs, EEPROMs (electrically erasable and programmable read only memory), EPROMs (erasable and programmable read only memory), flash memories, flexible discs, CD-ROMs (compact disc read only memory), CD-RWs (compact disc rewritable), DVDs (digital video disc), SD (secure digital) cards, and MOs (magneto-optical disc), and storing the program in a ROM or the like of the image forming apparatus, transmission of signals (image data and correction data) from the image writing controller 57 to the LED array heads of the irradiator 33Y-33K is controlled. Thus, the image writing controller 57 of the image forming apparatus serves as the data transmission controller to execute the data transmission controlling method of performing accurate data transmission without causing the cross talking problem in the FFCs 62Y-62K. This data transmission control program is a computer-executable program written by a legacy programming language or an object-oriented programming language such as assembler, C, C++, C# and Java (trademark), and can be stored in the above-mentioned recording media to be distributed.

Figure 3:
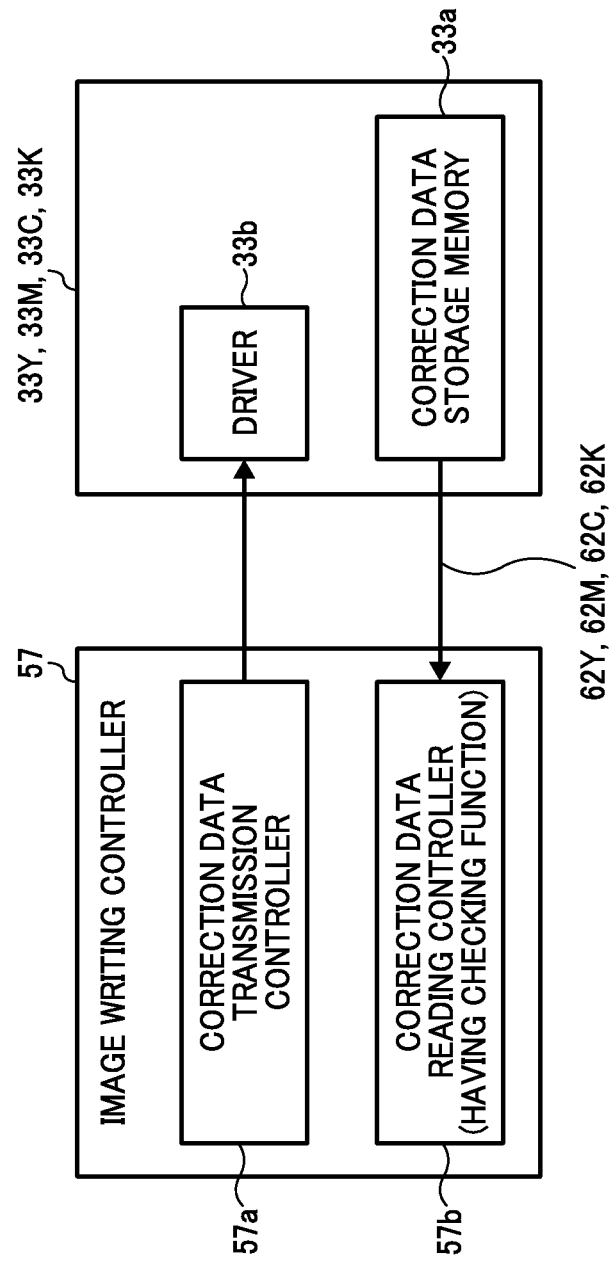
FIG. 3 is a block diagram illustrating an image writing controller and an irradiator of the image forming apparatus.

As illustrated in FIG. 3, the image writing controller 57 includes a correction data transmission controller 57a and a correction data reading controller 57b. In addition, the irradiators 33Y-33K include the above-mentioned LED array heads for use in forming Y, M, C and K images, and each of the irradiators includes a correction data storage memory, and a driver 33b. The LED array heads of the irradiators 33Y-33K are connected with the image writing controller 57 by the FFCs 62Y-62K (illustrated in FIGS. 4-6), respectively.

The correction data storage memory 33a provided in each of the irradiators 33Y, 33M, 33C and 33K is composed of a non-volatile memory such as NVRAMs (non-volatile random access memory), and stores correction data for collecting variations of the LEDs in each LED head. The correction data storage memory 33a stores data (such as parity information and check sum information) for transmission check of detecting presence or absence of a transmission error when the correction data are transmitted to the image writing controller 57 together with the correction data.

The correction data reading controller 57b of the image writing controller 57 reads out the correction data together with the data for transmission check stored in the correction data storage memories 33a in the irradiators 33Y-33K through the FFCs 62Y-62K before the irradiation process performed by the irradiators, and confirms whether the correction data are accurately read out based on the data for transmission check.

When the image reading controller 57b confirms that the correction data are accurately read out, the image reading controller 57b transmits the correction data to the correction data transmission controller 57a.

The correction data transmission controller 57a, which serves as a transmission timing adjuster and a transmission timing controller, performs processings such as arrangement conversion processing and image adjustment processing such that the correction data read out by the image data reading controller 57b are converted to such correction data as to be suitable for the arrangement of the LEDs in each of the LED array heads, thereby generating adjusted correction data. The correction data transmission controller 57a transmits the adjusted correction data to the drivers 33b of the irradiators 33Y-33K through the FFCs 62Y-62K.

The drivers 33b store the adjusted correction data, which are transmitted from the correction data transmission controller 57a through the FFCs 62Y-62K, in a non-volatile memory, etc. Thereafter, the drivers 33b perform lighting/extinction drive control by correcting image signals for each of the LEDs of the LED array heads, which are transmitted from the image writing controller 57 through the FFCs 62Y-62K, based on the adjusted correction data.

The irradiators 33Y-33K do not include a checker to check whether the adjusted correction data are accurately transmitted in order to reduce costs and size thereof. Therefore, the irradiators 33Y-33K cannot check whether the adjusted correction data are accurately transmitted from the correction data transmission controller 57a through the FFCs.

Therefore, when the adjusted correction data are transmitted from the correction data transmission controller 57a of the image writing controller 57 to the irradiators 33 through the FFCs 62Y-62K, it is preferable to take measures so that the data can be accurately transmitted. Specifically, when the adjusted correction data include errors, the drivers 33b of the irradiators 33Y-33K perform lighting control for LEDs by correcting the image signals based on the adjusted correction data including errors, thereby forming abnormal images such as vertical line images and vertical stripe images.

Therefore, as mentioned below, the image forming apparatus 1 enhances the accuracy of data transmission (particularly transmission of adjusted correction data) by subjecting the transmission of the adjusted correction data from the image writing controller 57 to the irradiators 33Y-33K to timing control to prevent occurrence of cross talk in the FFCs 62Y-62K.

Figure 4:
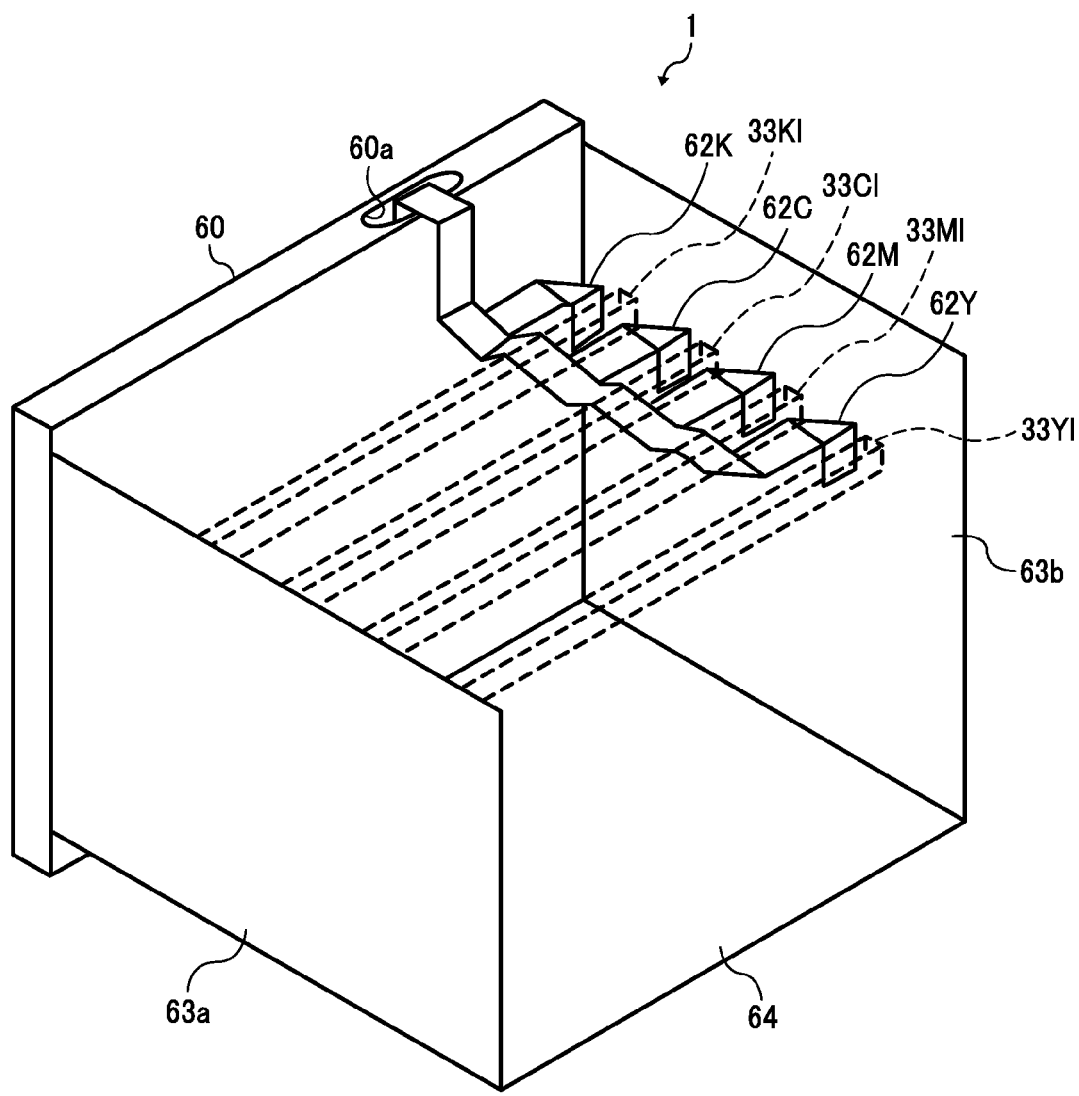
FIG. 4 is a perspective view illustrating a main portion of the image forming apparatus including a metal box.
Figure 5:
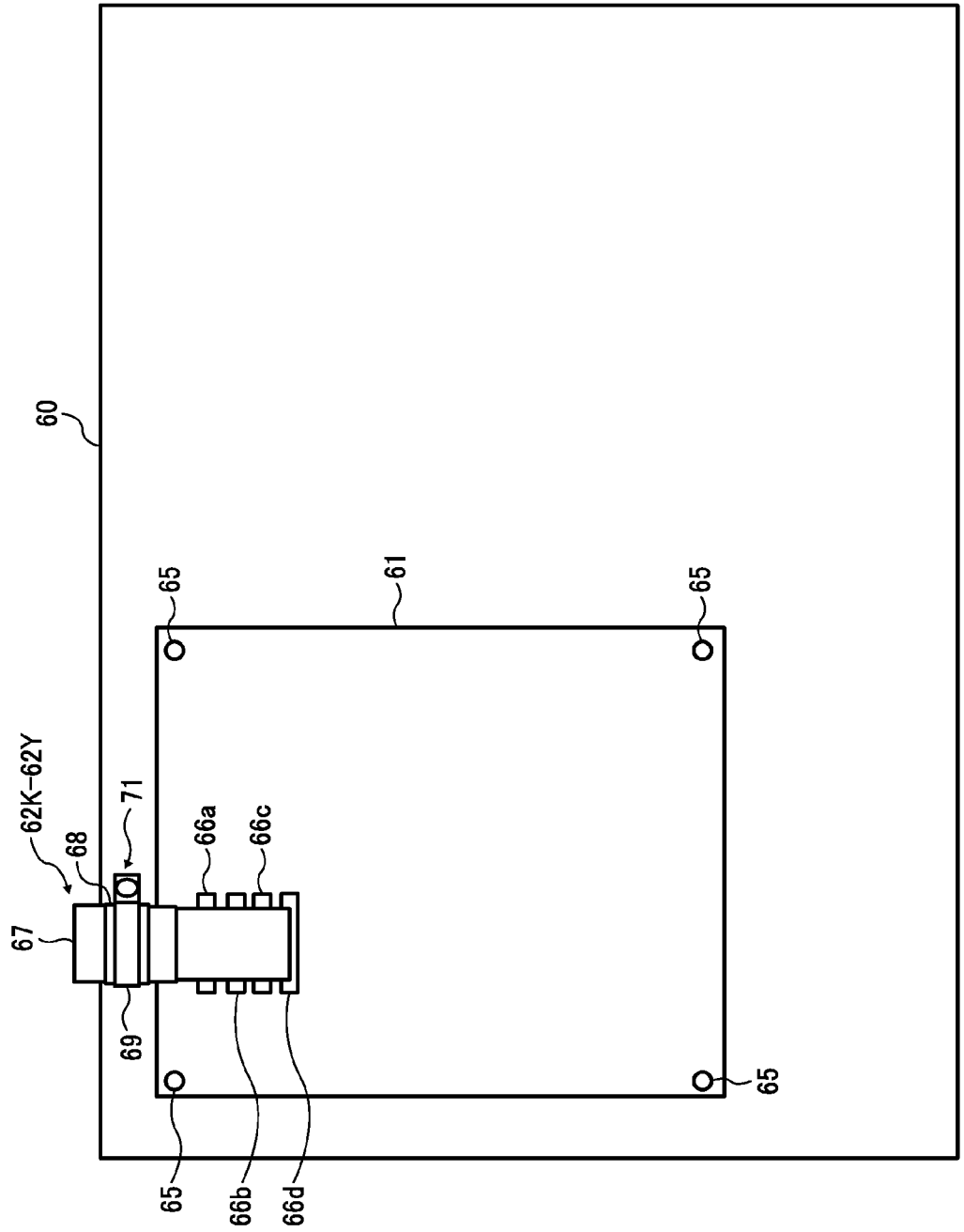
FIG. 5 is a schematic view illustrating backside of the metal box.
Figure 6:
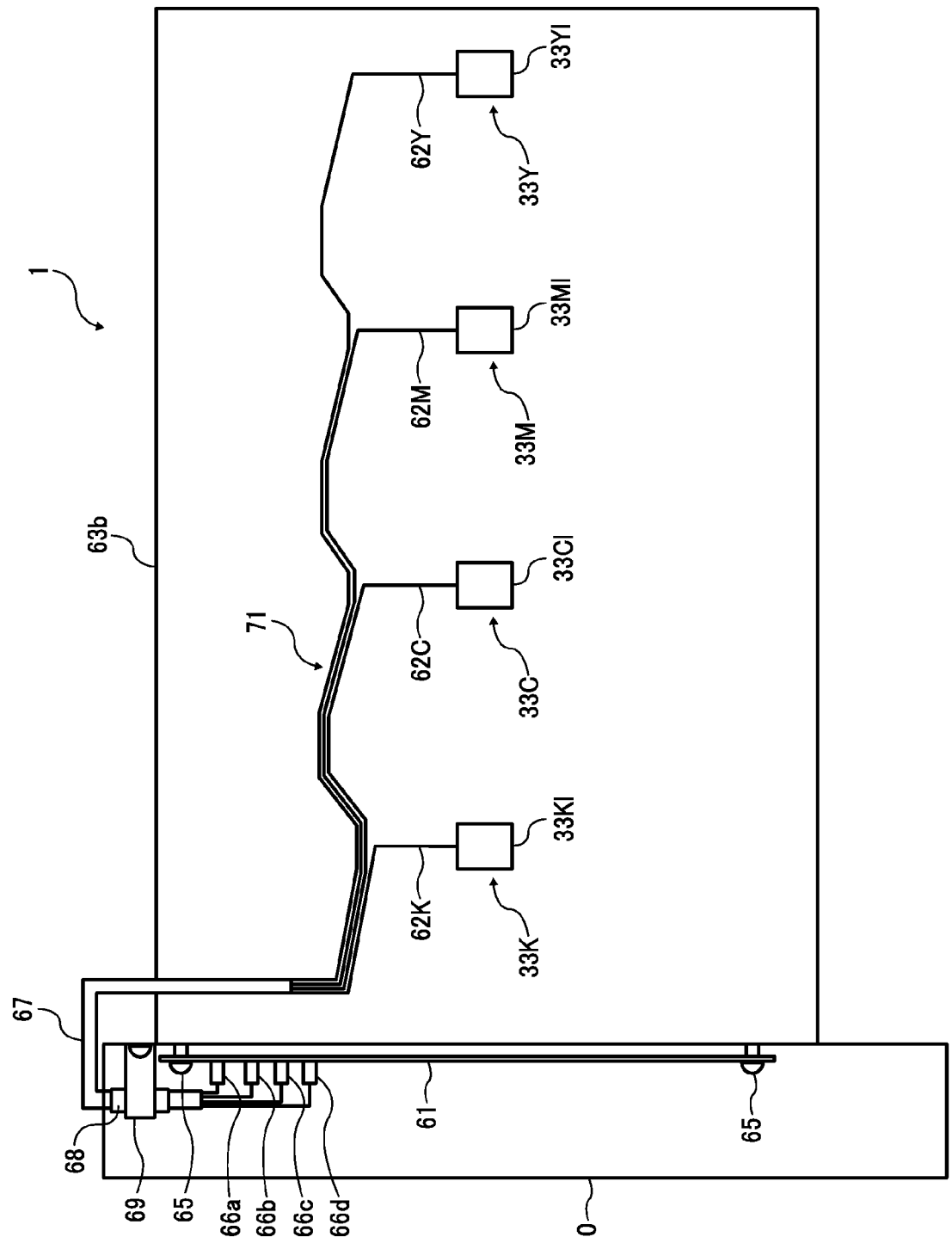
FIG. 6 is a side view illustrating the main portion of the image forming apparatus.

In the image forming apparatus 1, the controller 50, the computer interface 51, the image forming processor 52, the CTL 53, the print job managing portion 55, the image writing controller 57, the line memory 58, and the memory 59 are mounted in a control board 61 in a metal box 60, which is illustrated in FIGS. 4-6.

The image writing controller 57 mounted in the control board 61 is connected with LED array heads 33YI, 33MI, 33CI and 33KI of the irradiators 33Y, 33M, 33C and 33K using the FFCs 62Y, 62M, 62C and 62K, respectively.

When irradiation signals (image signals), which have been modulated based on the image data of color images, are input to the LED array heads 33YI-33KI, the LEDs of each array head are turned on or off to irradiate the corresponding photoreceptor 31 with light including image information, thereby forming an electrostatic latent image on the photoreceptor.

The LED array heads 33YI-33KI are attached to a pair of side plates 63a and 63b (illustrated in FIG. 4) of the image forming apparatus 1, which extend vertically and which are set at both the ends of the image forming apparatus in the main scanning direction. The lower ends of the side plates 63a and 63b are fixed to a bottom metal plate 64. In this regard, the side plates 63a and 63b and the bottom metal plate 64 may be integrated.

As illustrated in FIG. 4, the side plates 63a and 63b and the bottom metal plate 64 are connected with the metal box 60, which is a hollow box. The side plates 63a and 63b and the bottom metal plate 64 are made of an electroconductive material and are grounded using a code or the like.

The metal box 60 contains the control boar 61 therein. The control boar 61 is attached to the inner surface of the metal box 60 with a spacer therebetween using an attachment 65 so as to be insulated from the metal box.

The control board 61 and the LED array heads 33YI-33KI, particularly, the image writing controller 57 on the control board 61 and the LED array heads 33YI-33KI, are connected by the FFCs (bundle of communication lines) 62Y-62K, respectively, and the control board 61 outputs irradiation signals for color images to the corresponding LED array heads 33YI-33KI through the four FFCs 62Y-62K. In this regard, the four FFCs are drawn into the metal box 60 through an opening 60a formed on an upper portion of the metal box.

Each of the FFCs 62Y-62K is a bundle of signal lines arranged in a plane, and the FFCs are overlaid.

As illustrated in FIGS. 5 and 6, the four FFCs 62Y-62K are connected with the control board 61 using connectors 66a, 66b, 66c and 66d, and are bundled with a shield sheet 67 in the vicinity of the connectors 66a-66d.

In addition, an electroconductive tape 68, which is supported with a grounding member 69, is wound around the FFCs 62Y-62K. Since the grounding member 69 is fixed to the metal box 60, which is grounded, the electroconductive tape 68 is grounded.

Each of the FFCs 62Y-62K has a planar shape, and the FFCs are overlaid. As illustrated in FIG. 4, the FFC 62K is separated from the FFCs 62Y, 62M and 62C at such a position as to be connected with the LED array head 33KI. Similarly, the FFC 62C is separated from the FFCs 62Y and 62M at such a position as to be connected with the LED array head 33CI, and the FFC 62M is separated from the FFC 62Y at such a position as to be connected with the LED array head 33MI. The FFC 62Y separated from the FFCs 62M-62K is connected with the LED array head 33YI.

Next, the operation of this example will be described. In the image forming apparatus 1 of this example, signals are transmitted accurately through the FFCs 62Y-62K, in which four planar bundles of signal lines are overlaid so as to have a planar shape, without causing the cross talk problem.

As mentioned above, the four FFCs 62Y-62K are overlaid until the FFCs are separated from the others at such positions as to be connected with the corresponding LED array heads 33YI-33KI as illustrated in FIGS. 4 and 6.

In the image forming apparatus 1, image data for corresponding color images, control signals, clock CLKs, and power sources, which are illustrated in FIG. 7, are transmitted from the image writing controller 57 provided on the control board 61 to the LED array heads 33YI-33KI of the irradiators 33Y-33K through the FFCs 62Y-62K. In this regard, the specification and the pin assignment of the LED array heads 33YI-33KI are the same. Therefore, the same kinds of signals flow through signal lines of the FFCs 62Y-62K, which are overlaid as illustrated in FIG. 7, at a time when electrostatic latent images are formed on the photoreceptors 31Y-31K.

Among the FFCs 62Y-62K, the FFC 62M is a double-side long-distance both-surface-contact type FFC, both sides of which are contacted (sandwiched) with the FFC 62Y and the FFC 62C with a long distance; the FFC 62C is a one-side long-distance both-surface-contact type FFC, one side of which is contacted with the FFC 62M with a long distance and the other side of which is contacted with the FFC 62k with a short distance; the FFC 62Y is a long-distance one-surface-contact type FFC, one side of which is contacted with the FFC 62M with a long distance; and the FFC 62K is a short-distance one-surface-contact type FFC, one side of which is contacted with the FFC 62C with a short distance.

In general, in the overlaid FFCs 62Y-62K, a FFC through which a relatively small amount of current flows tends to be influenced by a FFC through which a relatively large amount of current flows, thereby causing the cross talk problem. In addition, in electric parts having a data bus, the drive capability of the data bus is set so as to be higher than that of other control signals. In general, in order to meet various timing specifications such as overshoot and undershoot, tuning of a damping resistor is made. In this case, there is a case where the signal current of data signals becomes smallest. Therefore, irradiation signals (image signals), which are data signals, are affected most easily by cross talk.

In addition, when data are transmitted from the control board 61 to the LED array heads 33YI-33KI at the same time in the image forming apparatus 1, the timing signals transit with the same timing, and therefore the timing signals are hardly affected by each other. However, since the data signals have different transit timings, the data signals tend to be easily affected by cross talk.

Figure 8:
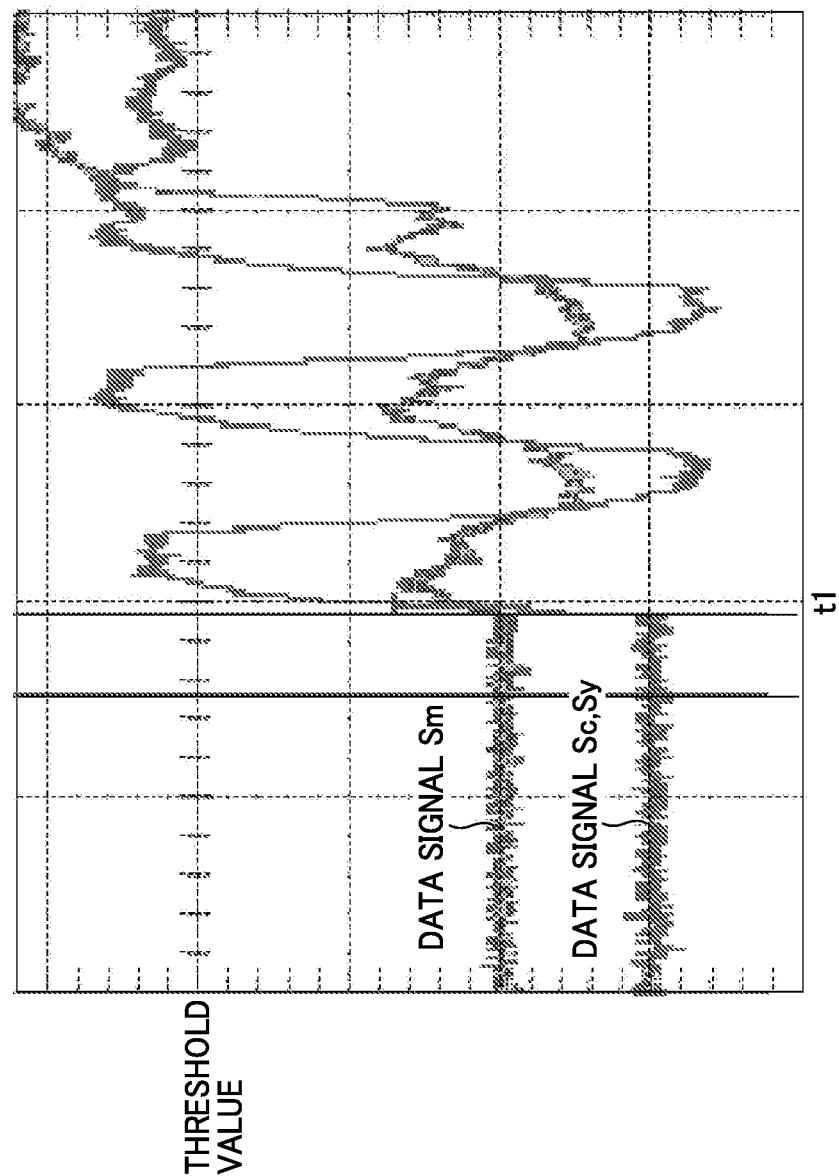
FIG. 8 is a view for describing how data signals cause cross talk.

For example, as illustrated in FIG. 8, when a data signal Sm flowing through the FFC 62M rises so as to be "1" greater than the threshold value at the same time of rising of data signals Sc and Sy respectively flowing the FFCs 62C and 62Y, which sandwich the FFC 62M, the data signal Sm is affected by cross talk, thereby increasing the voltage level of the data signal Sm. When the voltage level of the data signal Sm is increased so as to be higher than the threshold value, the signal is recognized as "1", resulting in transmission of erroneous data.

In the image forming apparatus 1 of this example, the FFC 62M is a double-side long-distance both-surface-contact type FFC, both sides of which are contacted (sandwiched) with the FFC 62Y and the FFC 62C with the longest distance as mentioned above, and therefore the FFC 62M is affected by cross talk most easily among the FFCs 62Y-62K.

The image forming apparatus 1 transmits not only the correction data and the adjusted correction data, but also image signals through the FFCs 62Y-62K. In this regard, since the contents and timing of the image signals change in each case, the image signals change in increments of 1 bit (i.e., change of only a 1 bit image occurs) even when cross talking occurs, and therefore formation of a visually abnormal image hardly occurs.

In contrast, when 1-bit change occurs in the correction data and the adjusted correction data, the correction data and the adjusted correction data cannot be accurately transmitted. In this case, the image is corrected based on the adjusted correction data, which are abnormal, and thereby a visually abnormal vertical line/stripe image is formed.

In order to avoid the problem, the image forming apparatus 1 delays (changes) the timing of transmitting the adjusted correction data from the correction data transmission controller 57a of the image writing controller 57 to the LED array heads 33YI, 33MI, 33CI and 33KI through the FFCs 62Y-62K. Namely, the correction data transmission controller 57a delays the timing of transmitting the adjusted correction data through the FFCs 62Y-62K to prevent occurrence of cross talk among the FFCs 62Y-62K, thereby making it possible to accurately transmit the adjusted correction data.

Figure 9:
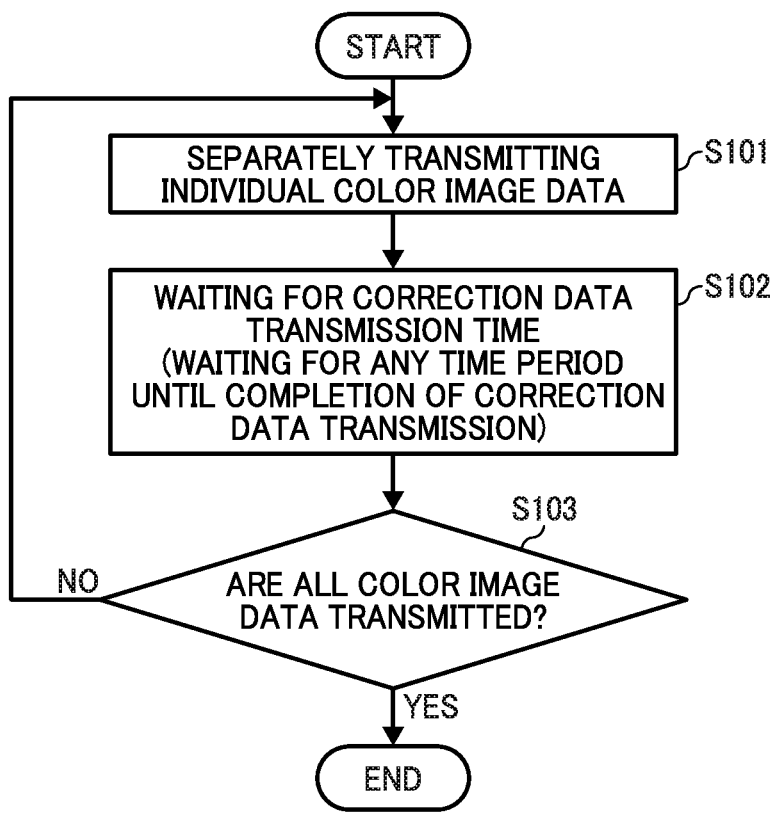
FIG. 9 is a flowchart illustrating a data transmission controlling process.

Specifically, as illustrated in FIG. 9, when the adjusted correction data are transmitted, the correction data transmission controller 57a initially transmits adjusted correction data for a first-order color image, which is preliminarily determined, to the corresponding LED array head 33YI, 33MI, 33CI or 33KI through the corresponding FFC 62Y, 62M, 62C or 62K (step S101).

When the correction data transmission controller 57a starts transmitting the first-order adjusted correction data, the correction data transmission controller waits for a time corresponding to the adjusted correction data transmission time (step S102), and then checks whether the adjusted correction data for all the color images are transmitted (step S103). In this regard, the adjusted correction data transmission time is a time changeable depending on the amount of the adjusted correction data.

When the adjusted correction data for all the color images are not yet transmitted (NO in step S103), the operation returns to re-execute step S101. Specifically, the data transmission control processing (step S101 to step S103) for the next color image is performed similarly.

When the adjusted correction data for all the color images are transmitted (YES in step S103), the data transmission control processing is completed.

Thus, the correction data transmission controller 57a can separately transmit the adjusted correction data for all the color images to the LED array heads 33YI-33KI through the corresponding FFCs 62Y-62K, thereby making it possible to perform accurate data transmission by preventing occurrence of cross talk among the FFCs.

The data transmission control processing is not limited to the above-mentioned method in which the timing of transmitting the adjusted correction data is delayed. For example, as illustrated in FIG. 10, it is possible to use a method in which the adjusted correction data are transmitted at the same time through the FFC 62Y and the FFC 62K, which are separated farthest from each other among the FFCs 62Y-62K, and then the adjusted correction data are transmitted through the FFCs 62C and 62M while delaying the data transmission timing.

Figure 10:
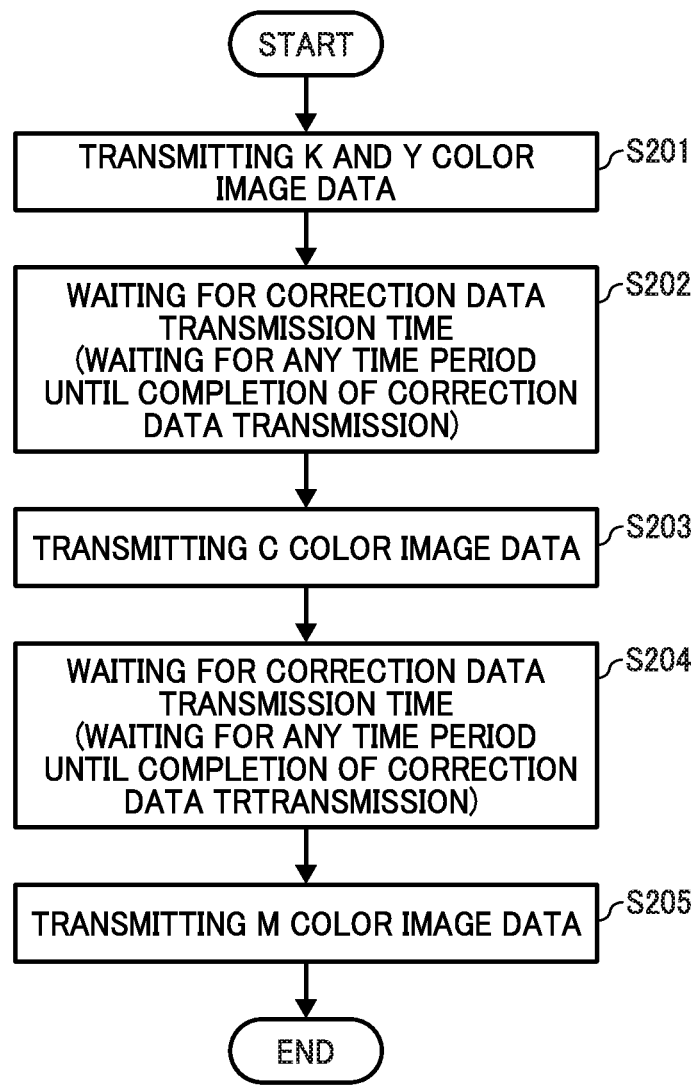
FIG. 10 is a flowchart illustrating a data transmission controlling process in which signals of two color images are transmitted at the same time through two bundles of signal lines which are farthest from each other.

Specifically, as illustrated in FIG. 10, at a time when the adjusted correction data are transmitted, the correction data transmission controller 57a transmits the adjusted correction data for the K and Y color images to the LED array head 33KI and the LED array head 33YI through the FFC 62K and the FFC 62Y, respectively, which are separated farthest from each other (step S201). When the correction data transmission controller 57a starts transmitting the adjusted correction data for the K and Y color images, the correction data transmission controller waits for a time corresponding to the adjusted correction data transmission time (step S202).

After the adjusted correction data transmission time elapses, the correction data transmission controller 57a transmits the adjusted correction data for the C color image to the LED array head 33CI through the FFC 62C (step S203). When the correction data transmission controller 57a starts transmitting the adjusted correction data for the C color image, the correction data transmission controller waits for a time corresponding to the adjusted correction data transmission time (step S204).

After the adjusted correction data transmission time elapses, the correction data transmission controller 57a transmits the adjusted correction data for the M color image to the LED array head 33MI through the FFC 62M. When transmission of the adjusted correction data for the M color image is completed, the data transmission control processing is completed (step S205).

Thus, after transmitting the adjusted correction data for the K and Y color images at the same time using the FFC 62K and the FFC 62Y, which are separated farthest from each other, the correction data transmission controller 57a sequentially transmits the adjusted correction data for the C and M color images using the FFC 62C and the FFC 62M while delaying the data transmission timing. Therefore, accurate data transmission can be performed while preventing occurrence of cross talk and shortening the transmission time for transmitting all the adjusted correction data.

The data transmission control processing is not limited to the above-mentioned methods. For example, as illustrated in FIG. 11, it is possible to use a method in which the adjusted correction data for two color images are transmitted at the same time through two of the FFCs 62Y-62K, which are separated from each other, and then the adjusted correction data for the other color images are transmitted at the same time through the others of the FFCs 62Y-62K, which are also separated from each other.

Figure 11:
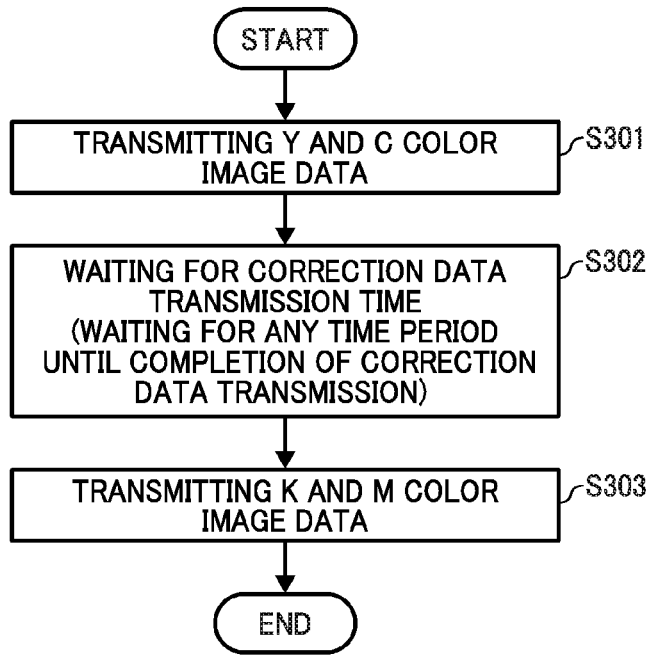
FIG. 11 is a flowchart illustrating a data transmission controlling process in which transmission of signals of two color images is sequentially performed.

Specifically, as illustrated in FIG. 11, at a time when the adjusted correction data are transmitted, the correction data transmission controller 57a transmits the adjusted correction data for the Y and C color images to the LED array head 33YI and the LED array head 33CI through the FFC 62Y and the FFC 62C, respectively, which are separated by the FFC 62M (step S301). When the correction data transmission controller 57a starts transmitting the adjusted correction data for the Y and C color images, the correction data transmission controller waits for a time corresponding to the adjusted correction data transmission time (step S302).

After the adjusted correction data transmission time elapses, the correction data transmission controller 57a transmits the adjusted correction data for the K and M color images to the LED array head 33KI and the LED array head 33MI through the FFC 62K and the FFC 62M, respectively, which are separated by the FFC 62C. When transmission of the adjusted correction data for the K and M color images is completed, the data transmission control processing is completed (step S303).

Thus, after transmitting the adjusted correction data for the two of the Y, M, C and K color images at the same time using two of the FFCs 62Y-62K, which are separated from each other, the correction data transmission controller 57a transmits at the same time the adjusted correction data for the others of the color images using the others of the FFCs 62Y-62K. Therefore, accurate data transmission can be performed while preventing occurrence of cross talk and further shortening the transmission time for transmitting all the adjusted correction data.

The data transmission control processing is not limited to the above-mentioned methods. For example, as illustrated in FIG. 12, it is possible to use a method in which after the adjusted correction data for all the Y, M, C and K color images are transmitted at the same time using the FFCs 62Y-62K, only the adjusted correction data for the M color image are transmitted again using the FFC 62M, which is most easily affected by cross talk among the FFCs 62Y-62K.

Figure 12:
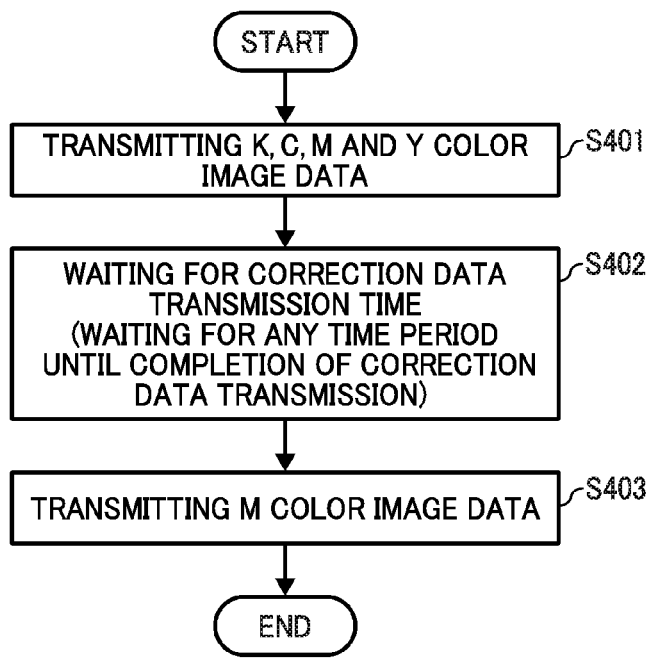
FIG. 12 is a flowchart illustrating a data transmission controlling process in which signals of all color images are transmitted at the same time and the signals of one color image which are most easily affected by cross talk are then transmitted again.

Specifically, as illustrated in FIG. 12, at a time when the adjusted correction data are transmitted, the correction data transmission controller 57a transmits the adjusted correction data for all the Y, M, C and K color images at the same time to the LED array heads 33YI-33KI using the FFCs 62Y-62K, respectively (step S401). When the correction data transmission controller 57a starts transmitting the adjusted correction data for all the color images, the correction data transmission controller waits for a time corresponding to the adjusted correction data transmission time (step S402).

After the adjusted correction data transmission time elapses, the correction data transmission controller 57a transmits the adjusted correction data for the M color image to the LED array head 33MI through the FFC 62M, which is affected most easily by cross talk among the FFCs 62Y-62K. When transmission of the adjusted correction data for the M color images is completed, the data transmission control processing is completed (step S403).

Thus, after transmitting the adjusted correction data for all the Y, M, C and K color images at the same time using all the FFCs 62Y-62K, the correction data transmission controller 57a transmits again only the adjusted correction data for the M color image using the FFC 62M, which is most easily affected by cross talk among the FFCs 62Y-62K. Therefore, accurate data transmission can be performed while preventing occurrence of cross talk and further shortening the transmission time for transmitting all the adjusted correction data.

Hereinbefore, a case where the correction data transmission controller 57a transmits the adjusted correction data to the LED array heads 33YI-33KI has been described. This technique can also be used for a case where the correction data reading controller 57b reads out the correction data from the correction data storage memory 33a of the irradiators 33Y-33K.

Figure 13:
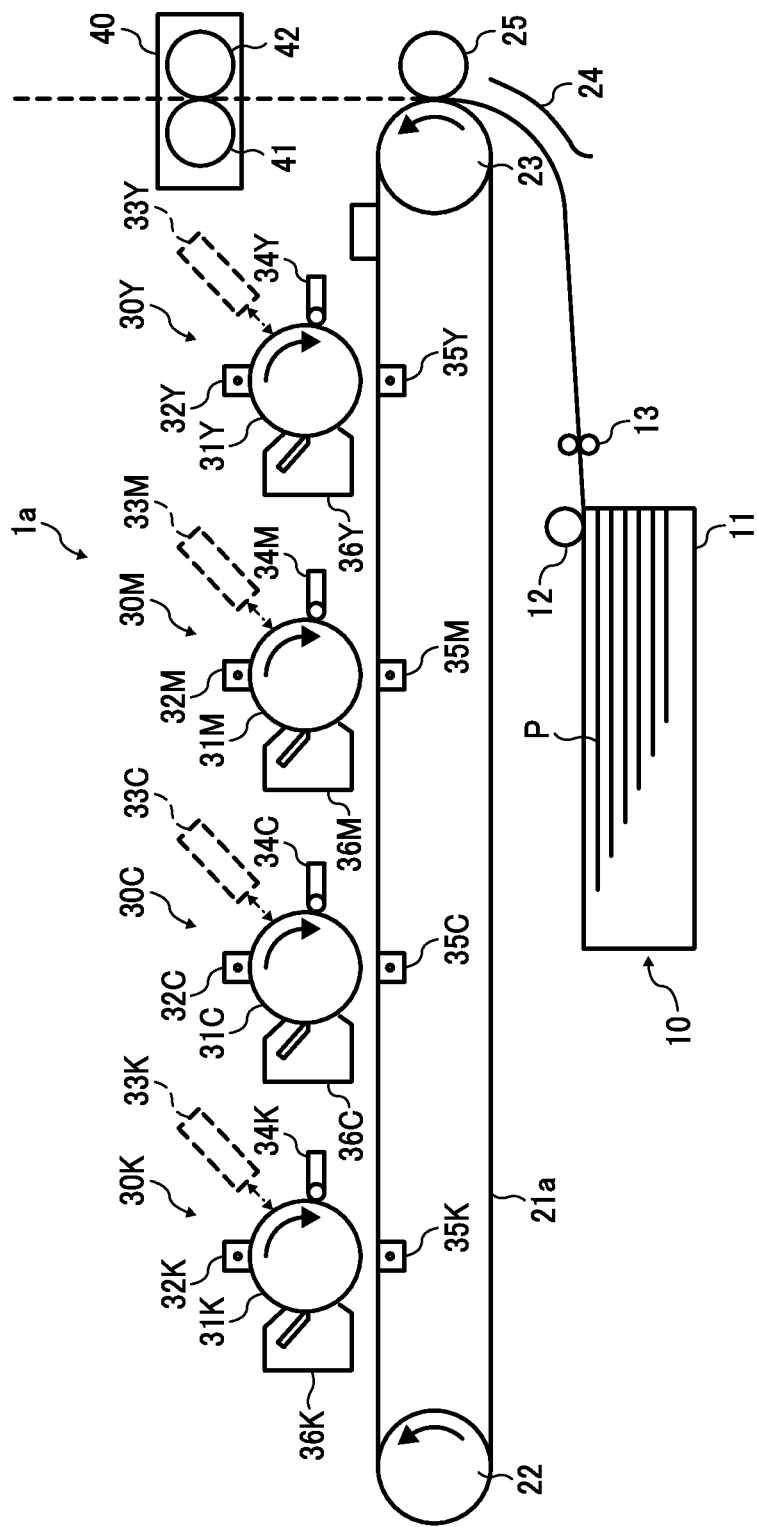
FIG. 13 is a schematic view illustrating another example of the image forming apparatus, which uses an intermediate transfer belt.

In addition, in the image forming apparatus 1 mentioned above, the recording medium P is fed by the feeding belt 21 along the image forming sections 30Y-30K so that the Y, M, C and K toner images are sequentially transferred to the recording medium and a combined color toner image is formed on the recording medium. However, the configuration of the image forming apparatus is not limited thereto, and for example, the image forming apparatus may be such an image forming apparatus 1a as illustrated in FIG. 13, which uses an intermediate transfer belt 21a. In FIGS. 1 and 13, like reference characters designate like corresponding parts. In the image forming apparatus 1a illustrated in FIG. 13, the intermediate transfer belt 21a is an endless belt tightly stretched by the driving roller 22 and the driven roller 23, and the image forming sections 30Y, 30M, 30C and 30K are arranged along the intermediate transfer belt 21a.

In the image forming sections 30Y-30K of the image forming apparatus 1a, the chargers 32Y, 32M, 32C and 32K evenly charges the corresponding photoreceptors 31Y, 31M, 31C and 31K, which are rotated clockwise in FIG. 13. The irradiators 33Y, 33M, 33C and 33K irradiate the charged photoreceptors 31Y-31K with light beams, which are modulated with corresponding color image data, to form electrostatic latent images on the photoreceptors. The developing devices 34Y, 34M, 34C and 34K respectively develop the electrostatic latent images on the corresponding photoreceptors 31Y-31K using Y, M, C and K toners to form Y, M, C and K toner images on the corresponding photoreceptors. The transferring devices 35Y, 35M, 35C and 35K, which are arranged on the backside of the intermediate transfer belt 21a, apply a transfer potential to the intermediate transfer belt 21a with predetermined timing to sequentially transfer the Y, M, C and K toner images to the intermediate transfer belt 21a so that the toner images are overlaid, resulting in formation of a combined color toner image on the intermediate transfer belt. The combined color toner image on the intermediate transfer belt 21a is transferred onto the recording medium P, which has been fed from the recording medium feeding portion 10, at a nip between the intermediate transfer belt 21a and a secondary transfer roller 25. The image forming apparatus 1a feeds the recording medium P bearing the combined color toner image thereon to the fixer 40 to fix the combined color toner image on the recording medium.

As mentioned above, in the image forming apparatus of this disclosure, plural FFCs (bundle of signal lines), which are arranged so as to be overlaid flatly and each of which includes flatly arranged plural bundles of signal lines, are provided, and the image writing controller 57 transmits and receives signals through the FFCs. The image forming apparatus includes, as the data transmitting device, the image writing controller 57, which includes a transmission timing adjuster (which is the correction data transmission controller 57a) to adjust the signal transmission timing of transmitting signals through the plural FFCs for each of the FFCs, and a transmission timing controller (which is also the correction data transmission controller 57a) to perform time division control on transmission timing for each of the FFCs.

Therefore, the signal transmission timing in the FFCs can be adjusted so that cross talk is not caused among the FFCs. Therefore, accurate signal transmission can be performed without causing cross talk using the FFCs (bundle of signal lines), which are arranged so as to be overlaid flatly and each of which includes flatly arranged plural bundles of signal lines.

In addition, the image forming apparatus of this disclosure includes a data transmitting device to separately transmit correction data to the plural LED array heads while performing lighting control on each LED of the LED array heads. The above-mentioned image writing controller 57 serves as the data transmitting device.

Therefore, the signal transmission timing of transmitting signals such as the adjusted correction data to the LED array heads can be adjusted so that cross talk is not caused among the FFCs. Therefore, accurate signal transmission can be performed without causing cross talk using the FFCs, which are arranged so as to be overlaid flatly and each of which includes flatly arranged plural bundles of signal lines. As a result, formation of an abnormal image such as vertical line or stripe image can be prevented, resulting in enhancement of image quality.

The image forming apparatus of this disclosure uses a data transmission controlling method which uses plural FFCs, which are arranged so as to be overlaid flatly and each of which includes flatly arranged plural bundles of signal lines, wherein the method includes a transmission timing adjustment processing step of adjusting the signal transmission timing for each of the FFCs; and a transmission timing control processing step of subjecting the transmission timing in the transmission timing control processing step to time division control for each of the FFCs.

Therefore, the signal transmission timing among the FFCs can be adjusted so that cross talk is not caused among the FFCs. Therefore, accurate signal transmission can be performed without causing cross talk using the FFCs (bundles of signal lines), which are arranged so as to be overlaid flatly and each of which includes flatly arranged plural bundles of signal lines.

The image forming apparatus of this disclosure uses a data transmission control program used for the image writing controller 57, which transmits and receives signals through plural FFCs, which are arranged so as to be overlaid flatly and each of which includes flatly arranged plural bundles of signal lines. By using the program, the image writing controller 57 allows a control processor such as CPUs to execute a transmission timing adjustment processing step of adjusting the signal transmission timing for each of the FFCs; and a transmission timing control processing step of subjecting the transmission timing in the transmission timing control processing step to time division control for each of the FFCs.

Therefore, the signal transmission timing among the FFCs can be adjusted so that cross talk is not caused among the FFCs. Therefore, accurate signal transmission can be performed without causing cross talk among the FFCs (bundles of signal lines), which are arranged so as to be overlaid flatly and each of which includes flatly arranged plural bundles of signal lines.

In addition, in the image forming apparatus of this disclosure, the correction data transmission controller 57*a* serving as the above-mentioned transmission timing controller performs time division control on the plural FFCs such that signal transmission is performed one by one in a predetermined order through the FFCs in such a manner that after signal transmission is started using one of the FFCs, next signal transmission is started using one of the other FFCs a predetermined time after the start of the first-mentioned signal transmission.

Therefore, accurate signal transmission can be performed without causing cross talk among the FFCs.

Further, in the image forming apparatus of this disclosure, the correction data transmission controller 57*a* serving as the above-mentioned transmission timing controller performs time division control on the plural FFCs such that after signal transmission is performed concurrently through two of the FFCs, which are farthest apart from each other among the FFCs, signal transmission is performed one by one through the others of the FFCs while delaying the signal transmission timing.

Therefore, accurate signal transmission can be performed without causing cross talk among the FFCs while shortening the signal transmission time.

Furthermore, in the image forming apparatus of this disclosure, the correction data transmission controller 57*a* serving as the above-mentioned transmission timing controller performs time division control on the plural FFCs such that the FFCs are grouped into a predetermined number of groups of FFCs such that FFCs in a group are not contacted with each other, and signal transmission is performed sequentially for each group in such a manner that after signal transmission is started using one of the groups of the FFCs, next signal transmission is started using one of the other groups of the FFCs while delaying the signal transmission timing.

Therefore, accurate signal transmission can be performed without causing cross talk among the FFCs while further shortening the signal transmission time.

Furthermore, in the image forming apparatus of this disclosure, the correction data transmission controller 57*a* serving as the above-mentioned transmission timing controller performs time division control on the plural FFCs such that signal transmission is performed concurrently through the FFCs, and then signal transmission is performed again through one of the FFCs which is predetermined and which is to be most easily affected by cross talk among the FFCs.

By using this method, even when the transmitted data are abnormal due to cross talk, the abnormal data can be corrected, and therefore accurate signal transmission can be performed while further shortening the signal transmission time.

In the image forming apparatus of this disclosure, the image writing controller 57, which serves as the above-mentioned data transmitting device, transmits image signals (main data signals) and adjusted correction data (correction data signals) for use in correcting the image signals through plural FFCs, and the correction data transmission controller 57*a*, which serves as the above-mentioned transmission timing controller, adjusts transmission timing of the adjusted correction data signals based on the transmission timing of the image signals.

By using this method, the adjusted correction data can be accurately transmitted without causing the cross talk problem, and thereby the image signals can be accurately corrected.

In addition, the image forming apparatus of this disclosure uses a flexible flat cable as the bundle of signal lines.

Therefore, occurrence of cross talk can be prevented even when signals are transmitted through the flexible flat cable. Namely, accurate signal transmission can be performed using a flexible flat cable.

As mentioned above, the data transmitting device of this disclosure, the image forming apparatus, and the data transmission controlling method of this disclosure can perform accurate signal transmission using plural bundles of signal lines, each of which include flatly arranged plural signal lines and which are overlaid, without causing the cross talk problem.

Any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc.

Alternatively, any one of the above-described and other methods of the present invention may be implemented by ASIC (Application Specific Integrated Circuits), prepared by interconnecting an appropriate network of conventional component circuits or by a combination thereof with one or more conventional general purpose microprocessors and/or signal processors programmed accordingly.

Additional modifications and variations of the present invention are possible in light of the above teachings. It is therefore to be understood that within the scope of the appended claims the invention may be practiced other than as specifically described herein.

What is claimed is:

1. A data transmitting device comprising:
   plural bundles of signal lines, each of which includes flatly arranged plural signal lines and which are overlaid in such a manner that surfaces of the bundles of signal lines are contacted with each other while the signal lines extend in a same direction, wherein signal transmission and reception are performed through the signal lines;
   a transmission timing adjuster to adjust signal transmission timing for each of the plural bundles of signal lines; and
   a transmission timing controller to perform time division control such that the transmission timing adjuster adjusts the signal transmission timing under the time division control for each of the plural bundles of signal lines,
   wherein the transmission timing controller performs time division control such that the transmission timing adjuster performs signal transmission sequentially in a set order through the plural bundles of signal lines in such a manner that after signal transmission is started using one of the plural bundles of signal lines, next signal transmission is started using one of the others of the plural bundles of signal lines a set waiting time after the start of the first-mentioned signal transmission.

2. The data transmitting device according to claim 1, wherein the transmission timing controller performs time division control such that after the transmission timing adjuster performs signal transmission concurrently through two of the plural bundles of signal lines, which are farthest apart from each other among the plural bundles of signal lines, the transmission timing adjuster performs signal transmission one by one in a set order through the others of the plural bundles of signal lines while delaying signal transmission timing.

3. The data transmitting device according to claim 1, wherein the transmission timing controller performs time division control such that the plural bundles of signal lines are grouped into a set number of groups of bundles of signal lines such that bundles of signal lines in a group are not contacted with each other, and the transmission timing adjuster performs signal transmission sequentially for each group of bundles of signal lines in such a manner that after signal transmission is started using one of the groups of bundles of signal lines, next signal transmission is started using one of the other groups of bundles of signal lines while delaying signal transmission timing.

4. The data transmitting device according to claim 1, wherein the transmission timing controller performs time division control such that after the transmission timing adjuster performs signal transmission concurrently through the plural bundles of signal lines, the transmission timing adjuster performs signal transmission again through one of the plural bundles of signal lines, which is set so as to be most easily affected by cross talk among the bundles of signal lines.

5. The data transmitting device according to claim 1, wherein the data transmitting device transmits main data signals and correction data signals for use in correcting the main data signals through the plural bundles of signal lines, and wherein the transmission timing controller allows the transmission timing adjuster to adjust transmission timing of the correction data signals based on transmission timing of the main data signals.

6. The data transmitting device according to claim 1, wherein each of the bundles of signal lines is a flexible flat cable.

7. An image forming apparatus comprising:
   plural LED arrays to emit light beams from LEDs thereof;
   plural bundles of signal lines; and
   the data transmitting device according to claim 1 to transmit image data for controlling lighting of each of the LEDs of the plural LED arrays and correction data for use in correcting the image data through the plural bundles of signal lines.

8. A data transmission controlling method for controlling data transmission and reception using plural bundles of signal lines, each of which includes flatly arranged plural signal lines and which are overlaid in such a manner that surfaces of the bundles of signal lines are contacted with each other while the signal lines extend in a same direction, comprising:
   adjusting transmission timing of signals, which are to be transmitted through the plural bundles of signal lines, for each of the plural bundles of signal lines; and
   performing time division control such that the signal transmission timing is adjusted under the time division control for each of the plural bundles of signal lines,
   wherein the time division control performs signal transmission sequentially in a set order through the plural bundles of signal lines in such a manner that after signal transmission is started using one of the plural bundles of signal lines, next signal transmission is started using one of the others of the plural bundles of signal lines a set wailing time after the start of the first-mentioned signal transmission.

9. A non-transitory recording medium storing a plurality of instructions which, when executed by a processor, cause the processor to perform the data transmission controlling method according to claim 8.

* * * * *